United States Patent [19]

Fouss et al.

[11] 4,397,585

[45] Aug. 9, 1983

[54] APPARATUS FOR INSERTING FOLDABLE CONDUIT BELOW GROUND

[75] Inventors: James L. Fouss, Findlay, Ohio; Michael L. Cook, Sandusky, Mich.; Worthy O. Hassan, Findlay, Ohio

[73] Assignee: Hancor, Inc., Findlay, Ohio

[21] Appl. No.: 227,237

[22] Filed: Jan. 22, 1981

[51] Int. Cl.³ .............................................. E02F 5/10
[52] U.S. Cl. .................................. 405/183; 405/174; 405/180
[58] Field of Search .................. 405/156, 174–176, 405/43

[56] References Cited

U.S. PATENT DOCUMENTS

| | | | |
|---|---|---|---|
| 3,120,107 | 2/1964 | Juusela et al. | 405/156 |
| 3,132,416 | 3/1961 | Hait | 29/429 |
| 3,217,500 | 11/1965 | Diamond et al. | 405/156 |
| 3,217,501 | 11/1965 | Boa | 405/156 |
| 3,250,077 | 5/1966 | Ede | 405/156 |
| 3,575,006 | 9/1968 | Rugroden | 61/72.6 |
| 3,590,588 | 7/1971 | Draper | 405/176 |
| 3,706,207 | 12/1972 | Cornelius | 61/72.6 |
| 4,179,227 | 12/1979 | Child | 405/182 |

*Primary Examiner*—Dennis L. Taylor
*Attorney, Agent, or Firm*—Fay & Sharpe

[57] ABSTRACT

A plow arrangement is disclosed for inserting continuous lengths of foldable conduit in the ground. A plow forms a cavity in the ground for receiving the conduit. Folded conduit is conveyed from a reel to an inlet end of a feeder or boot. As the conduit passes through the feeder, it is unfolded. The feeder discharges the unfolded conduit horizontally behind the plow. Soil lifted by the plow falls around the unfolded conduit constraining it to its unfolded configuration. A vehicle advances the plow and feeder through the ground. The feeder includes a surface for engaging the base of the conduit and guides for engaging the top. The surface and guides converge adjacent the outlet of the feeder to unfold the conduit passing inbetween. Further the surface and guides have arcuate portions that bend the conduit about its apex to urge it to its unfolded configuration.

29 Claims, 11 Drawing Figures

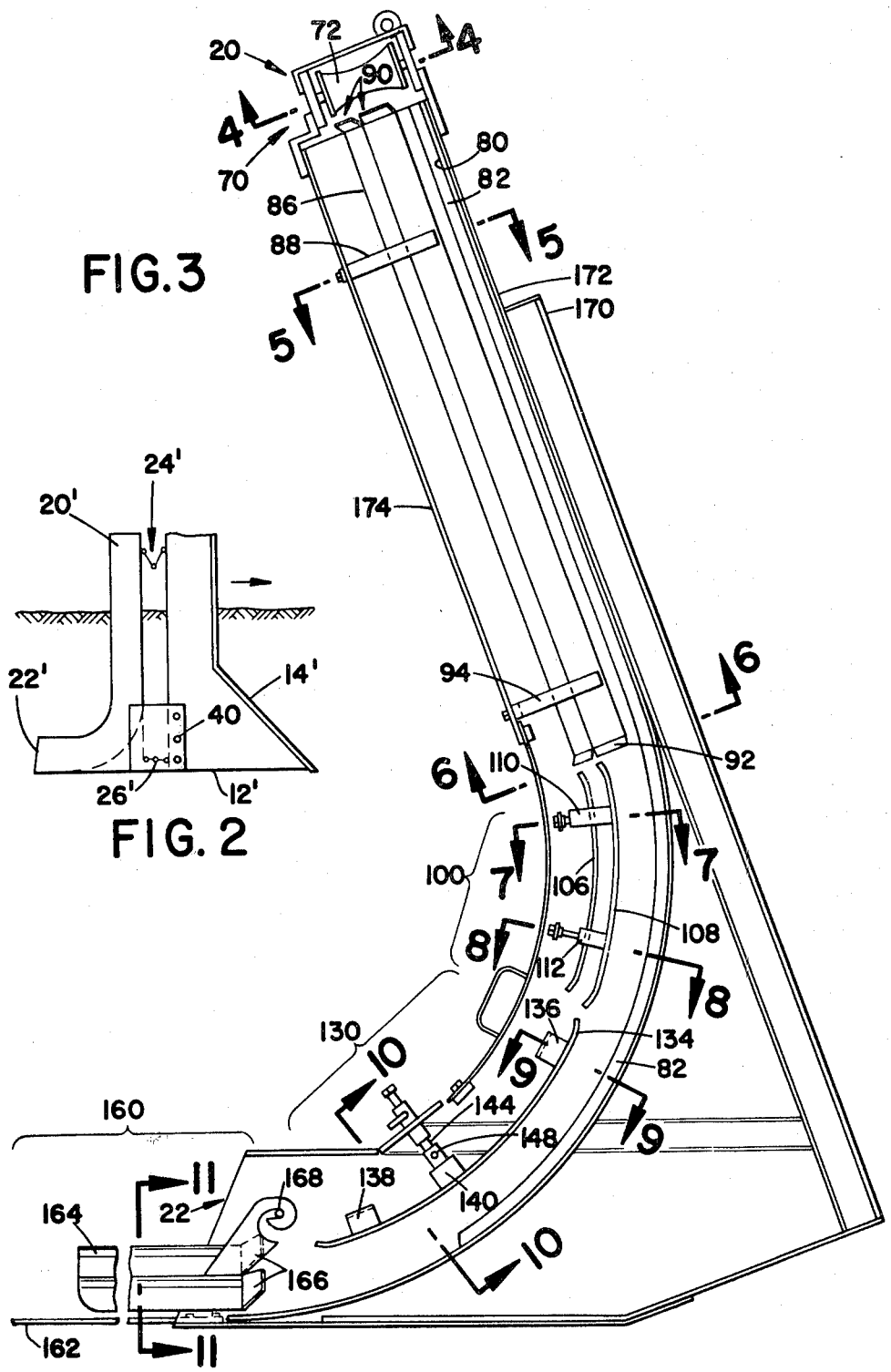

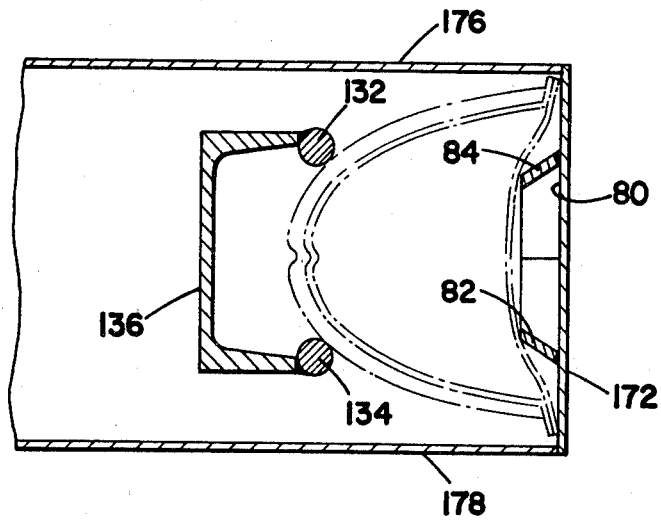
FIG. 9
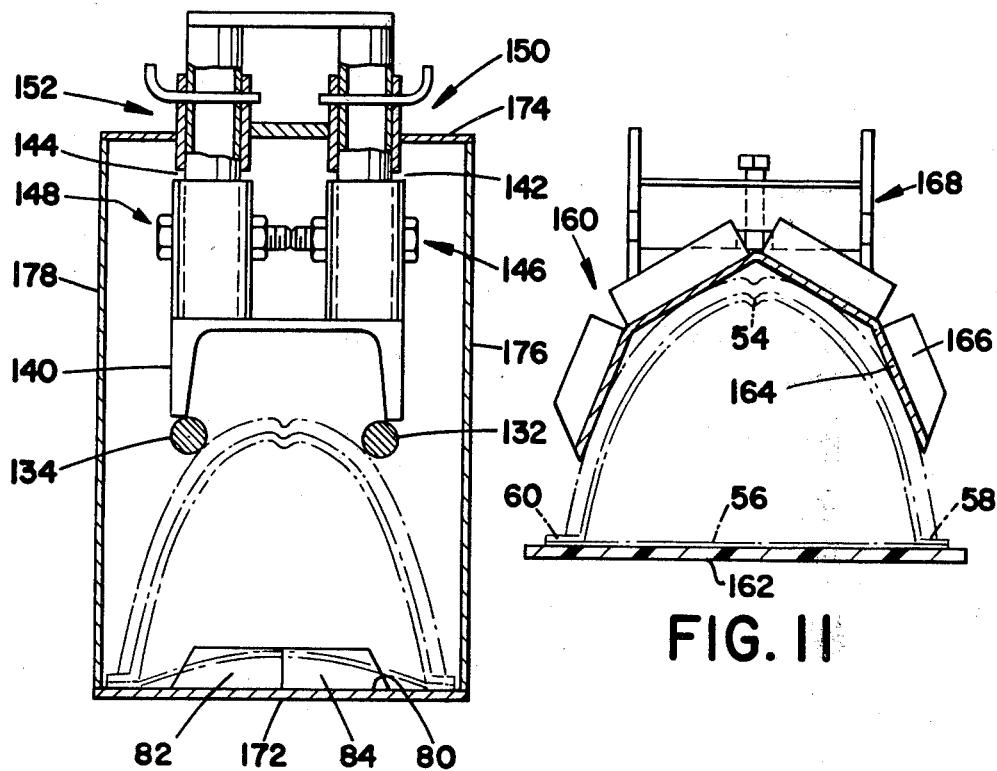
FIG. 10
FIG. 11

APPARATUS FOR INSERTING FOLDABLE CONDUIT BELOW GROUND

BACKGROUND OF THE INVENTION

This invention pertains to the art of inserting foldable conduits in subterranean locations. More particularly, the present invention pertains to the art of plowing in foldable arched conduits, particularly for drainage applications, beneath the surface of the soil.

Numerous plow devices have been developed for inserting circular, nonfolding conduits beneath the surface of the soil. Typically, these units included a rigid plow unit mounted at the lower end of a heavy support member. The plow unit was pulled through the soil lifting the soil sufficiently to form a cavity or trench immediately behind the plow. A tubular boot or feeder was mounted directly behind the plow to feed the circular tubing into the cavity. As the plow unit was pulled by a tractor or other heavy equipment of sufficient strength to force the plow through the soil, the soil loosened by the plow would fall by gravity around the circular conduit. The circular conduit was fed from a large reel which was mounted either on the tractor or on a separate vehicle into the boot or feeder. Because the reels held rigid circular, non-folded conduit, they were bulky, yet held a limited amount of conduit. Once the lead end of the tubing was anchored in the ground by the weight of the soil, additional tubing was pulled from the reel as the plow advanced. Various types of conduits have been plowed into the soil such as corrugated drainage tubing, natural gas lines, and the like. Typical prior art plows are shown for example in U.S. Pat. No. 4,179,227, issued Dec. 18, 1979 to James L. Child, Jr. et al., U.S. Pat. No. 3,706,207, issued Dec. 19, 1972 to Werner Cornelius et al., and U.S. Pat. No. 3,575,006, issued Apr. 13, 1971 to Roger R. Rugooden et al. A prior approach for eliminating bulky reels of non-foldable conduit is shown in U.S. Pat. No. 3,132,416, issued May 12, 1964 to James M. Hait.

The boot or feeder associated with the prior art plows are generally circular sleeves for guiding the circular tubing into the ground. The circular conduit being non-foldable, the boots or feed guides were not adapted to alter the conduit between folded and unfolded configurations. The present invention enables foldable conduits to be inserted or plowed into the soil.

SUMMARY OF THE INVENTION

In accordance with the present invention, there is provided an apparatus for inserting underground foldable conduit which is foldable or unfoldable between a generally flattened configuration for shipping and the like and a hollow configuration for conveying fluids underground. The apparatus includes a boot or feeder which has an inlet end that is adapted to be disposed above ground and an outlet end which is adapted to be disposed below ground. The outlet end includes means for defining an interior cross section which is shaped similar to the exterior of the cross section of the conduit in its hollow configuration. The conduit is fed from the inlet end through the boot or feeder to the outlet end at which it is discharged in its hollow configuration.

A principal advantage of the present invention is that it inserts foldable conduits into subterranean locations.

Another advantage of the present invention is that it permits long, continuous lengths of conduit, on the order of a mile or more, to be plowed into the soil.

Other advantages will become apparent to those reading and understanding the following detailed description of the preferred embodiment.

DETAILED DESCRIPTION OF THE DRAWINGS

The invention may take physical form in certain parts and arrangements of parts, a preferred embodiment of which is shown in the drawings. The drawings are presented only for purposes of illustrating the preferred embodiment and are not to be construed as limiting the invention.

FIG. 2 is an alternate embodiment of the plow and boot or feeder arrangement of FIG. 1;

FIG. 3 is a side sectional view of a boot or feeder in accordance with the present invention;

FIG. 9 is a sectional view of the feeder of FIG. 3 taken through section line 9—9;

FIG. 10 is a sectional view of the feeder of FIG. 3 taken through section line 10—10; and FIG. 11 is a sectional view of the feeder of FIG. 3 taken through section line 11—11.

DESCRIPTION OF THE PREFERRED EMBODIMENT

Figure 1:
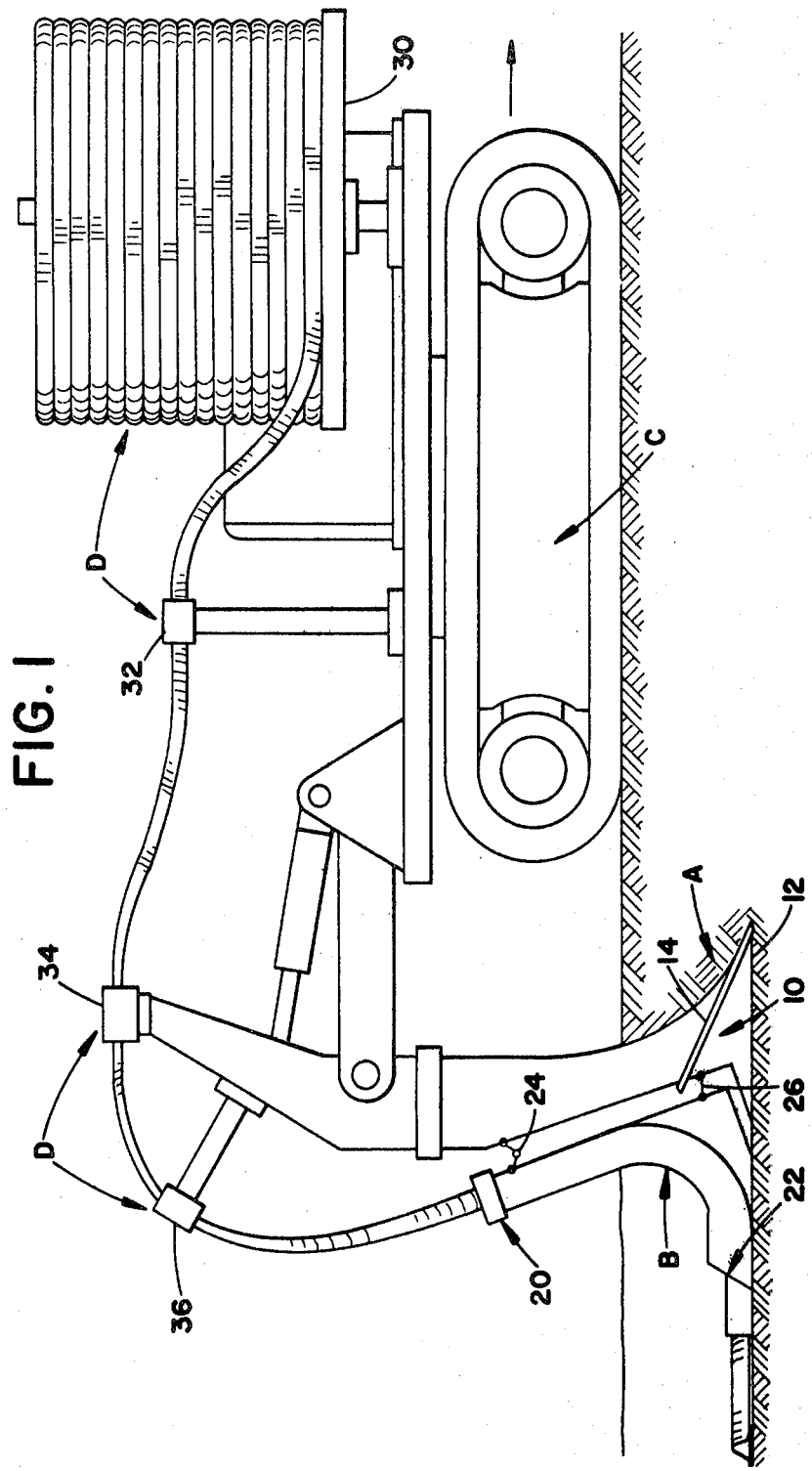
FIG. 1 is a diagrammatic illustration of an apparatus for inserting a foldable conduit in the soil.

FIG. 1 illustrates an apparatus for plowing a foldable conduit into the ground or soil. The apparatus includes a plow A for lifting the soil to form a cavity or trench therebehind. A boot or feeder B is attached to the plow to discharge unfolded foldable conduit into the cavity behind the plow A. An off-road vehicle or tractor C advance the plow A and the attached feeder B forward through the ground. A conveying means D conveys or feeds folded conduit to the feeder B at substantially the same rate as the vehicle C advances the plow A and feeder B.

The plow A includes a plow point 10 which is configured to project into the earth and lift the soil to the cavity or trench. The plow point has a substantially flat bottom surface 12 such that the cavity has a substantially flat bottom. The plow point also has a sloping upper surface 14 to cam the soil upward. As is conventional in the art, the plow may be oscillated or vibrated as it is advanced.

The boot or feeder B has an inlet end 20 which receives the conduit in a folded or partially folded configuration from the conveying means D and an outlet end 22 which discharges the conduit in its open or unfolded configuration into the cavity formed by the plow A. The folded or flattened configuration connotes the conduit's flattened, compact shipping configuration and the unfolded or hollow configuration connotes the conduit's hollow, fluid conveying configuration. The feeder is configured to receive the tubing generally vertically and bend it sufficiently that it is discharged substantially horizontally into the cavity. Floating linkage connects the feeder B with the plow A. The floating linkage consists of a pair of pivotally connected links 24 and another similar link 26. One link of the pair of links 24 is connected to the feeder and the other is connected to the plow just above ground level. The link 26 is pivotally connected at one end to the feeder and at the other end to the plow closely adjacent its bottom surface 12. The floating linkage permits the feeder and the plow to undergo a controlled amount of independent relative movement. This absorbs forces from uneven pulling forces and vibrations exerted by the heavy vehicle C, from uneven resistance to the pulling force caused by rocks, roots, changes in soil density, and the like. Further if the plow is designed to have an oscillatory or vibratory motion, it permits the feeder B to remain relatively stationary along the flat bottom of the cavity.

The conveying means D includes a rotatable platform 30 upon which is placed a reel of the conduit in its folded configuration. Pairs of rollers 32, 34, and 36 convey the folded conduit from the reel to the inlet end of the feeder with a minimum of frictional resistance. When the leading end of the conduit is frictionally engaged in the soil, the conduit is pulled from the reel, through the conveying means, and through the feeder by the forward motion of the vehicle.

FIG. 2 illustrates an alternate plow construction and an alternate embodiment of a feeder B which conforms with the alternate plow construction. In the embodiment of FIG. 2, like elements are marked with the same reference numerals as the corresponding elements of the embodiment of FIG. 1 followed by a prime ('). The plow includes a relatively flat bottom surface 12' and a sloping upper surface 14' for lifting the soil to form the flat-bottomed trench or cavity. A pair of side plates 40 are attached to the plow between the rear end of the plow and the feeder to inhibit soil crumbs from falling into the trench or cavity between the plow and the feeder. An inlet end 20' of the boot is more vertically disposed to match the more vertical rear surface of the plow. An outlet end 22' of the boot is disposed to discharge unfolded or hollow configured conduit substantially horizontally into the cavity.

FIGS. 3-11 illustrate a preferred embodiment of the feeder B in greater detail. The preferred embodiment is particularly adapted for use in conjunction with the arched or semiround conduit described and claimed in the present assignee's co-pending patent application Ser. No. 967,514, filed Dec. 7, 1978, now U.S. Pat. No. 4,245,924. It will be appreciated, however, that the preferred embodiment is readily adaptable for use with other semiround conduit, pipe, or tubing constructions and that the present invention is applicable to other designs of foldable conduit, pipe, tubing, and the like.

The conduit may have an unconnected seam in its flattened shipping configuration, which seam must be joined or sealed to form the conduit into its hollow fluid conveying configuration. If the conduit has an unconnected seam, it is contemplated that the feeder include a structure for joining the unconnected seam. The joining structure can include a pair of rollers or cam surfaces for joining a snap or zipper-like seam, heat wheel for a heat sealed seam, staple, rivet or other fastener inserting structure, or other structure which conforms the conduit to its hollow configuration.

Figure 4:
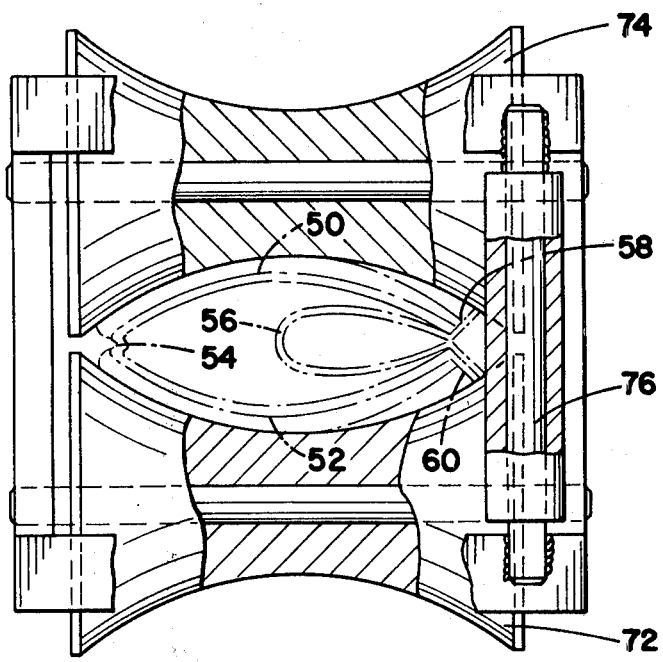
FIG. 4 is a cross section of the feeder of FIG. 3 taken through section line 4—4.

With particular reference to FIG. 4, the conduit of the preferred embodiment has a corrugated top wall comprising first and second side walls 50 and 52 which are connected along an apex edge by a hinge 54. A flexible, perforated base 56 is connected with flanges 58 and 60 extending along the base edges of the side walls. The flanges provide a bearing surface on which the conduit rests on the bottom of the cavity. In the folded or flattened configuration, the base edges are disposed closely adjacent each other with the flexible base 56 folded inside of the side walls. In the unfolded, hollow configuration, note FIG. 11, the base edges are spread apart such that the top wall has a generally parabolic arch-shaped cross section and the flexible base is straight and taut.

With reference to FIGS. 3 and 4, at the input end 20 is a means 70 for squeezing the conduit to its folded, flattened configuration. In its folded configuration, the conduit is more resistant to torque than in its unfolded, hollow configuration and is less apt to twist in the feeder. The squeezing means 70 includes first and second arcuate rollers 72 and 74. The arc of the rollers is configured such that the conduit in its folded, flattened configuration fits between the arcuate rollers. Another roller 76 is disposed transverse to the arcuate rollers to reduce the friction on the base of the conduit and to position the conduit accurately within the arcuate rollers.

Figure 5:
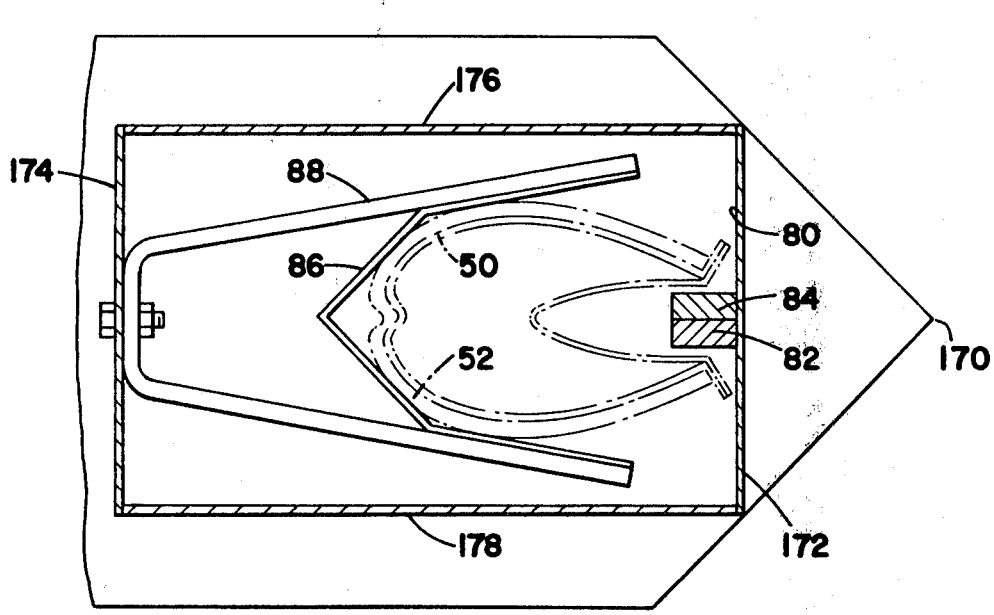
FIG. 5 is a sectional view of the feeder of FIG. 3 taken through section line 5—5.

With reference to FIGS. 3 and 5 the feeder has a generally flat surface 80 for engaging the base or flanges of the substantially folded conduit. A pair of rails 82 and 84 project upward from the base engaging surface 80 to separate the base edges of the conduit. The rails help insure that the conduit remain straight in the feeder without twisting or turning sideways. Disposed opposite to and generally parallel to the base engaging surface is a means for engaging the top wall, or more specifically the side walls 50 and 52 which make up the top wall. The top wall or side walls engaging means and base engaging surface 80 define a cross section which determines the degree of unfolding of the conduit. The side wall engaging means includes generally a U-shaped sleeve 86 which conforms to the exterior cross section of the conduit in its folded or partially folded configuration. The U-shaped sleeve 86 and the base engaging surface 80 define an interior cross section which controls the degree of unfolding or hollowing of the conduit disposed therebetween. The generally U-shaped sleeve is mounted to the feeder B by a mounting bracket 88. Toward the inlet end 20, the U-shaped sleeve has a plurality of flanges 90 which flare outward.

Figure 6:
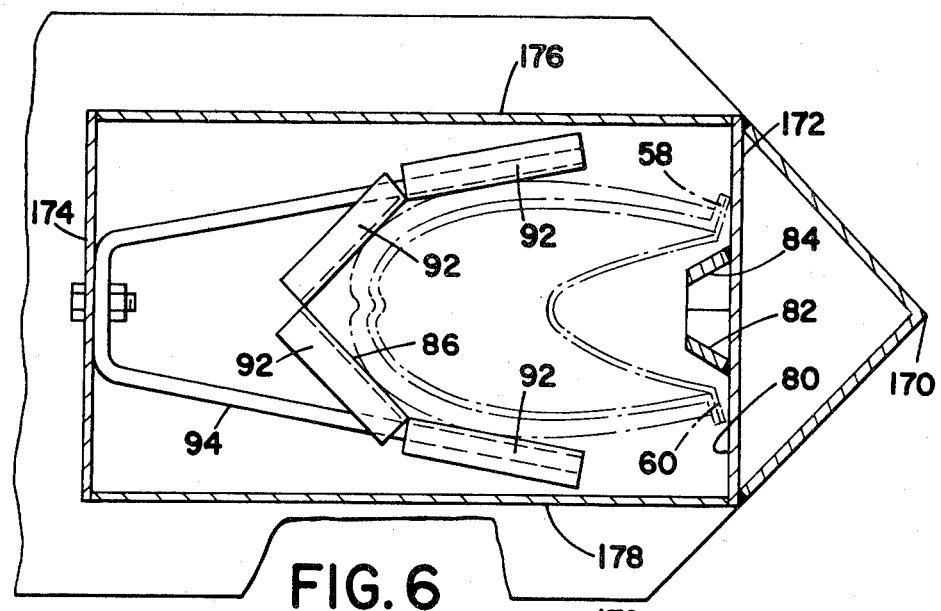
FIG. 6 is a sectional view of the feeder of FIG. 3 taken through section line 6—6.

With continued reference to FIGS. 3 and 5, and further reference to FIG. 6, the cross section of the U-shaped sleeve 86 expands or becomes wider further from the inlet end. Similarly the distance between the base engaging surface 80 and the apex of the U-shaped sleeve decreases. This change in cross section forces the conduit from a less unfolded or more flattened configuration adjacent section line 5—5 to a more unfolded or hollow configuration at section line 6—6. The U-shaped sleeve has a plurality of flanges 92 which flare outward and its end away from the inlet end. A second bracket 94 supports the inward end of the U-shaped sleeve. Adjacent the inward end of the U-shaped sleeve, the rails 82 and 84 start to diverge and angle toward each other. This cams the flanges 58 and 60 at the base edges of the conduit further apart.

Figure 7:
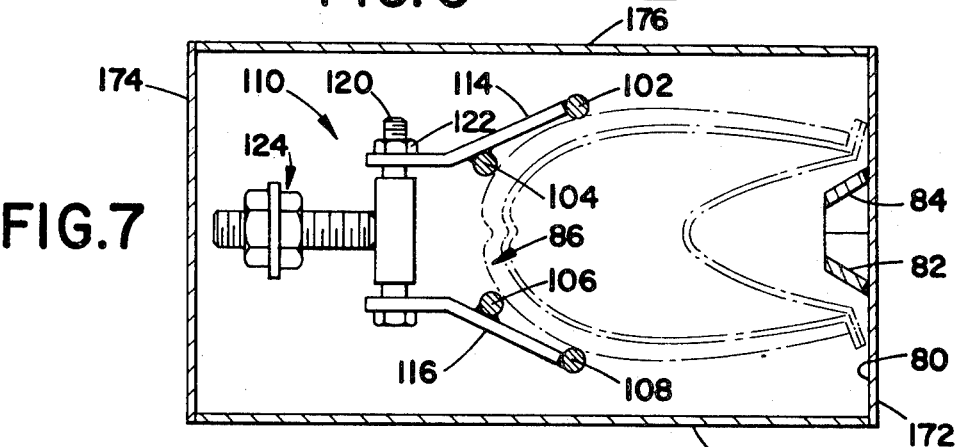
FIG. 7 is a sectional view of the feeder of FIG. 3 taken through section line 7—7.
Figure 8:
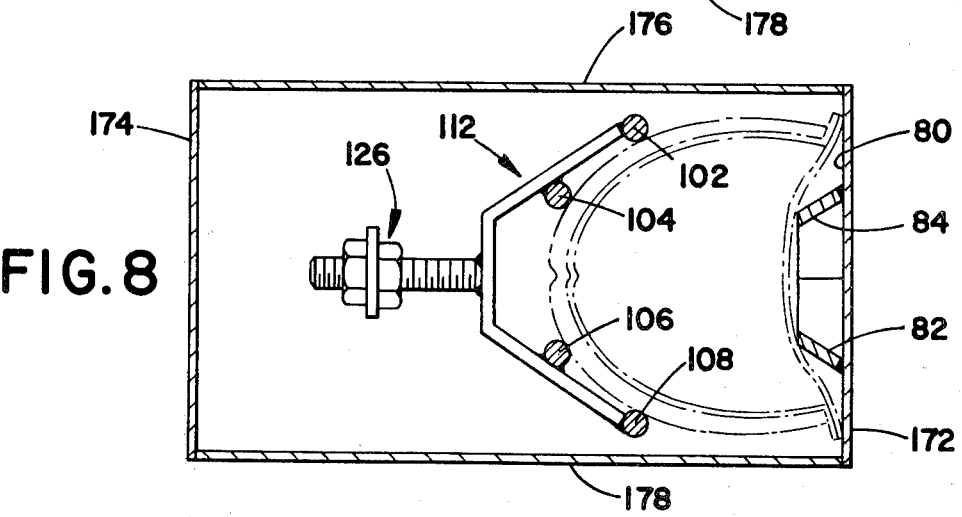
FIG. 8 is a sectional view of the feeder of FIG. 3 taken through section line 8—8.

With continued reference to FIG. 3, the base engaging surface 80 arcs from its generally vertical orientation adjacent the inlet end 20 to a generally horizontal orientation adjacent the outlet end 22. This arcing of the base engaging surface 80 bends the conduit about its hinge or apex 54 which urges the conduit toward its unfolded configuration. Disposed along the arcuate portion of base engaging surface 80, the top or side wall engaging means includes an arcuate guide means. The arcuate guide means and the base engaging surface 80 define the cross section and the degree of unfolding of the conduit. With particular reference to FIGS. 3, 7, and 8, the arcuate guide means includes a first or upper guide means 100. The first guide means 100 includes four arcuate rods 102, 104, 106 and 108. The arcuate rods generally folow the arcuate contour of the conduit base engaging surface 80 but converge towards it as they approach the outlet end 22. The converging of the rods and the base engaging surface force the top wall of the conduit toward the base and a more unfolded, hollow configuration. The rails 82 and 84 continue to diverge camming the flanges 58 and 60 further apart. The rods 102, 104, 106, and 108 are mounted on a pair of mounting brackets 110 and 112. The mounting bracket 110 has a pair of side pieces 114 and 116 which are interconnected by a pin 118. A bolt 120 and nut 122 arrangement extend through the side pieces 114 and 116 for selectively causing the side pieces to pivot about pin 118. This enables the divergence of rods 102 and 104 relative to rods 106 and 108 to be adjusted. A height adjustment means 124 enables the height of the rods relative to the base supporting surface 80 to be adjusted. The second mounting bracket 112 similarly has an adjustment means 126 for adjusting the height of the rods relative to the base engaging surface 80.

With particular reference to FIGS. 3, 9, and 10, the arcuate guide means further includes a second or lower guide means 130. The second guide means 130 is mounted to allow limited rocking movement to compensate for any uneven pulling or tugging on the conduit as it moves through the feeder. The second guide means includes a first arcuate rod 132 and a second arcuate rod 134 for engaging the side walls of the conduit. The arcuate rods 132 and 134 are connected to each other adjacent their ends by brackets 136 and 138 which limit their separation. Generally centrally along rods 132 and 134, the rods are connected to each other by a bracket 140 which is connected with the feeder for limited relative movement. A pair of connecting bars 142 and 144 are connected with bracket 140 by nut and bolt arrangements 146 and 148. The nut and bolt arrangements 146 and 148 also function to set the spacing of rods 132 and 134. The bars 142 and 144 are slidingly connected with the feeder at fittings 150 and 152 which allow limited pivotal movement. Midway along the lower guide means 130, rails 82 and 84 converge. The projection of the rails 82 and 84 above the base engaging surface 80 forces the base to flex inward which prevents the conduit from reaching its fully unfolded configuration. The rods 132 and 134 converge toward surface 80 as they approach the outlet end 22 until the rods 132 and 134 and surface 80 define the fully unfolded or hollow cross section of the tubing.

With reference to FIGS. 3 and 11, the tubing is discharged from the outlet end 22, in its unfolded, hollow configuration. In many cases, the tubing will have been folded for a long duration relative to the memory of the plastic material from which the hinge 54 is constructed. This tends to bias the conduit toward its folded configuration, causing a tendency for the unfolded tubing to return to a partially folded or flattened configuration. To inhibit the tubing from returning to a partially folded configuration, a means 160 is provided for constraining the tubing to its unfolded, hollow configuration until there is sufficient loading from backfill and soil. The means 160 includes a sheet 162 which extends rearward from the outlet end 22. The sheet 22 has a relatively smooth surface on which the base 56 and flanges 58 and 60 of the conduit engage. Because the surface is smooth, the flanges 64 and 66 are easily slid apart by the pressure of the backfill. Further the smooth surface enables the sheet to slide from underneath the conduit even after the conduit has been fully surrounded with backfill. The means 160 further includes a soil shield 164 which holds the conduit in its unfolded configuration until the conduit is sufficiently displaced from the boot to receive substantial loading from the backfill. The soil shield 165 is a generally U-shaped sleeve which diverging flanges 166 at its entrance end. The soil shield is pivotally connected at 168 to the feeder to allow it to float or bounce with fluctuations in the tension on the conduit and the like.

The feeder has a leading edge 170 which is generally triangular in cross section to assist in pushing aside soil crumbs which may converge around the back of the plow. Further the boot includes a front, rear, and side walls 172, 174, 176, and 178, respectively, for inhibiting soil from entering the conduit path and to provide a surface for the various mounting brackets described above.

The invention has been described with reference to the preferred embodiment. Alterations and modifications will occur to others upon reading and understanding the detailed description of the preferred embodiment. It is our intention to include all such alterations and modifications insofar as they come within the scope of the appended claims or the equivalents thereof.

Having thus described in detail a preferred embodiment of the present invention, we now claim:

1. An apparatus for inserting below the surface of the soil foldable conduit which is foldable between a generally flattened configuration in which two conduit wall portions are disposed generally side-by-side and adjacent and a hollow configuration in which the two conduit wall portions are at least partially displaced to defined a hollow passage therebetween, the appartaus comprising:
   a feeder having an inlet end adapted to be disposed above the soil surface and an outlet end adapted to be disposed below the soil surface, the inlet end defining an inner cross section which is shaped similar to the exterior cross section of the foldable conduit in its flattened configuration, unfolding means for at least partially separating the two conduit wall portions to urge the conduit toward the hollow configuration, the outlet end defining an interior cross section which is shaped similar to the exterior cross section of the foldable conduit in its hollow configuration, whereby the conduit is folded as it is fed from the inlet end through the feeder to the outlet end and is discharged from the outlet end in its hollow configuration.

2. The apparatus as set forth in claim 1 further including conveying means for conveying the conduit in its flattened configuration to the inlet end.

3. The apparatus as set forth in claim 2 further including coil support means for supporting a coil of the foldable conduit in its flattened configuration, the conveying means being operatively connected with the coil support means for conveying the conduit from the coil support means to the inlet end.

4. The apparatus as set forth in claim 1 further including a plow for forming a cavity into which the conduit is inserted, the plow including a plow point which is configured to excavate a cavity with a flat bottom surface and to lift soil higher than the conduit.

5. The apparatus as set forth in claim 4 wherein the outlet opening is disposed to discharge the conduit substantially horizontally behind the plow point.

6. The apparatus as set forth in claim 5 further including side plates connected between the plow point and outlet opening for inhibiting soil from returning to the cavity before the conduit is discharged from the outlet end into the cavity.

7. The apparatus as set forth in claim 5 further including a floating linkage for connecting the feeder with the plow, the floating linkage permitting a limited amount of independent relative vertical movement between the plow and the feeder.

8. The apparatus as set forth in claim 5 wherein the unfolding means includes an arcuate portion between its inlet end and its outlet end, the arcuate portion being disposed to bend the conduit such that the conduit is urged toward its hollow configuration.

9. The apparatus as set forth in claim 8 further including a smooth, supporting surface extending generally horizontally from the outlet end such that the discharged conduit is supported by the supporting surface, whereby the base of the conduit can slide easily on the supporting surface fully to its hollow configuration under the weight of the soil.

10. The apparatus as set forth in claim 9 further including a soil shield extending generally horizontally from the outlet end, the soil shield having an internal cross section which conforms with the exterior cross section of the conduit in its hollow configuration.

11. The apparatus as set forth in claim 1 wherein the feeder includes a generally flat surface for engaging a base portion of the conduit, the base engaging surface extending between the inlet end and the outlet end.

12. The apparatus as set forth in claim 11 wherein the unfolding means includes at least one rail disposed on the base engaging surface for separating opposite edges of the base of the conduit, the rail being disposed adjacent the inlet end and extending along the base engaging surface toward the outlet.

13. The apparatus as set forth in claim 12 further including a second rail disposed on the base engaging surface, the first and second rails diverging as they extend into the feeder from the inlet end.

14. The apparatus as set forth in claim 13 wherein the first and second rails are canted toward each other.

15. The apparatus as set forth in claim 11 further including a pair of rollers disposed adjacent the inlet end for urging the conduit to its flattened configuration.

16. The apparatus as set forth in claim 11 wherein the feeder includes a generally U-shaped sleeve disposed opposite the base engaging surface adjacent the inlet end, the U-shaped sleeve and base engaging surface controlling the degree of unfolding of the conduit.

17. The apparatus as set forth in claim 16 wherein the cross section of the generally U-shaped sleeve varies such that it confines the conduit to a more flattened configuration adjacent the inlet end and a more hollow configuration away from the inlet end.

18. The apparatus as set forth in claim 11 wherein the base engaging surface has an arcuate portion between the inlet end and the outlet end such that bending the conduit along the arc urges the conduit toward its hollow configuration.

19. The apparatus as set forth in claim 18 wherein the feeder further includes arcuate guide means disposed opposite and along the arcuate portion of the base engaging surface, the arcuate guide means and the conduit base engaging surface defining the degree of unfolding of the conduit.

20. The apparatus as set forth in claim 19 wherein the arcuate guide means includes a plurality of fixedly disposed rods.

21. The apparatus as set forth in claim 19 wherein the arcuate guide means includes movable guide means mounted for limited rocking movement whereby the movable portion of the arcuate guide means moves to compensate for motion of the feeder.

22. The apparatus as set forth in claim 21 wherein the arcuate guide means is a plurality of interconnected rods.

23. An apparatus for inserting in the ground foldable arched conduit which has a pair of corrugated side walls connected along an apex edge by a hinge and a flexible base connected to the side walls along base edges, the conduit having a flattened, folded configuration in which the base edges are substantially adjacent to each other with the flexible base folded between the side walls and having a hollow, unfolded configuration in which the side walls have an arched cross section with the base edges spread apart and the flexible base disposed taut and substantially flat, the apparatus comprising:
  means for conveying folded conduit from a reel; and,
  a feeder including:
    roller means disposed adjacent an inlet end for engaging the conduit side walls for receiving the conduit generally in the flattened, folded configuration;
    means disposed to receive the conduit from the inlet end rollers for urging the conduit base edges to spread apart such that the conduit is urged toward the unfolded configuration; and,
    means disposed adjacent an outlet end for continuing to urge the conduit toward the unfolded configuration such that unfolded conduit is discharged in the ground.

24. The apparatus as set forth in claim 23 wherein the means for urging the conduit base edges apart includes an arcuate portion between the inlet end and the outlet end which is disposed to bend the conduit about the apex edge hinge such that the conduit is urged toward its unfolded configuration.

25. The apparatus as set forth in claim 23 wherein the feeder includes a base engaging surface between the inlet and outlet ends, the base engaging surface engaging the base edges of the conduit, and a pair of diverging rails disposed on the base engaging surface for spreading the base edges apart.

26. The apparatus as set forth in claim 23 wherein the feeder includes a base engaging surface between the inlet and outlet ends for engaging the base edges of the conduit and conduit side wall engaging means between the inlet and outlet ends for engaging the side walls of the conduit, the relative positioning of the base wall engaging surface and the side wall engaging means defining the degree of unfolding of the conduit.

27. The apparatus as set forth in claim 26 wherein the base engaging surface and the side wall engaging means converge toward the outlet end urging the conduit toward its unfolded configuration.

28. The apparatus as set forth in claim 27 wherein the side wall engaging means includes at least one rod engaging each side wall, the rods being mounted for limited movement relative to the base engaging surface.

29. An apparatus for inserting below ground foldable conduit which is unfoldable and foldable between a generally flattened configuration for shipping and a hollow configuration for conveying fluids below ground, the apparatus comprising:

a plow for forming in the ground a cavity into which the conduit is to be inserted;

a conveying means for conveying the conduit from a reel of conduit in its flattened configuration;

a feeder having an inlet end above ground for receiving conduit from the feeding means and an outlet end below ground for discharging conduit behind the plow in its hollow configuration, the feeder including a generally flat surface for engaging a base portion of the conduit, the base engaging surface having an arcuate portion between the inlet end and outlet end such that bending the conduit along the arcuate surface portion urges the conduit toward its hollow configuration; and a vehicle for advancing the plow and feeder through the ground.

* * * * *